US008520616B2

United States Patent
Cui et al.

(10) Patent No.: US 8,520,616 B2
(45) Date of Patent: Aug. 27, 2013

(54) METHOD AND DEVICE FOR USER PAIRING FOR UPLINK MULTI-USER MIMO UNDER COORDINATED MULTIPLE POINT TRANSMISSION SCENARIO

(75) Inventors: Qimei Cui, Beijing (CN); Shiyuan Li, Beijing (CN); Xiaofeng Tao, Beijing (CN); Chao Wang, Beijing (CN); Xianjun Yang, Beijing (CN)

(73) Assignee: Sony Corporation, Tokyo (JP)

( * ) Notice: Subject to any disclaimer, the term of this patent is extended or adjusted under 35 U.S.C. 154(b) by 326 days.

(21) Appl. No.: 12/860,537

(22) Filed: Aug. 20, 2010

(65) Prior Publication Data
US 2011/0044272 A1 Feb. 24, 2011

(30) Foreign Application Priority Data
Aug. 21, 2009 (CN) .......................... 2009 1 0170940

(51) Int. Cl.
*H04W 4/00* (2009.01)
(52) U.S. Cl.
USPC .......................................... 370/329; 370/341
(58) Field of Classification Search
USPC ...... 370/239, 3.41, 395.4, 464–465, 310–350
See application file for complete search history.

(56) References Cited

U.S. PATENT DOCUMENTS

| 2010/0058917 | A1* | 3/2010 | Scandroglio et al. | 83/840 |
| 2010/0142466 | A1* | 6/2010 | Palanki et al. | 370/329 |
| 2010/0238984 | A1* | 9/2010 | Sayana et al. | 375/219 |
| 2010/0272032 | A1* | 10/2010 | Sayana et al. | 370/329 |
| 2010/0322171 | A1* | 12/2010 | Dekorsy et al. | 370/329 |
| 2011/0305223 | A1* | 12/2011 | Koo et al. | 370/335 |

OTHER PUBLICATIONS

User Pairing Transmission Scheme in Uplink Coordinated Multipoint Reception, Qiang Li, 2010 IEEE.*

* cited by examiner

*Primary Examiner* — Warner Wong
(74) *Attorney, Agent, or Firm* — Oblon, Spivak, McClelland, Maier & Neustadt, L.L.P.

(57) ABSTRACT

A method of pairing users for an uplink multi-user multiple-input-multiple-output (MU-MIMO) system under coordinated multipoint transmission (CoMP) scenario in a communication system, which includes: selecting, by a first cell of the communication system, at least one initial user served by the cell as a first paired user; selecting, by the first cell, a candidate paired user according to the service type of the first paired user; and determining, from the different service types of the first paired user and the candidate paired user, a pairing type to be formed, and determining whether the candidate paired user and the first paired user can be paired into the pairing type to be formed by using a predetermined determination criterion according to the pairing type. It is further provided a device for performing the method. The throughput and communication efficiency of the communication system can be improved with the method and device for pairing users.

19 Claims, 9 Drawing Sheets

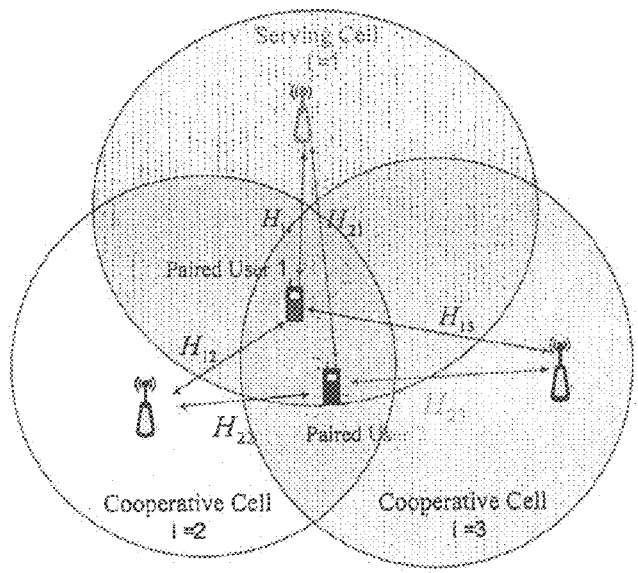
Fig. 7
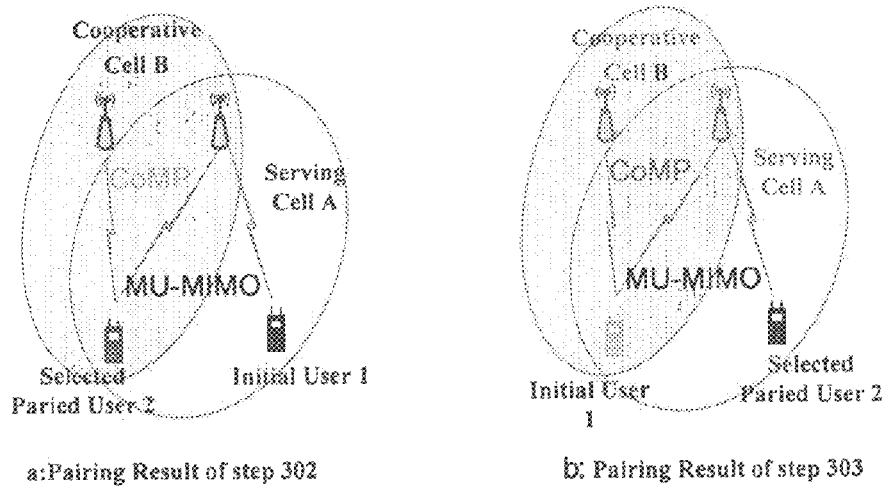
a: Pairing Result of step 302
b: Pairing Result of step 303
Fig. 8A
Fig. 8B

METHOD AND DEVICE FOR USER PAIRING FOR UPLINK MULTI-USER MIMO UNDER COORDINATED MULTIPLE POINT TRANSMISSION SCENARIO

This application claims priority to Chinese Patent Application No. 200910170940.4, filed with the Chinese Patent Office on Aug. 21, 2009 and entitled "Method and apparatus of pairing users for uplink multi-user multiple-input-multiple-output (MU-MIMO) under coordinated multipoint transmission (CoMP) scenario", which is hereby incorporated by reference in its entirety.

FIELD OF THE INVENTION

The present invention relates to a method for selecting a user in a multi-user MIMO (MU-MIMO) system, and in particular to an uplink MU-MIMO pairing solution supporting the coordinated multipoint transmission (CoMP) in long term evolution-advanced (LTE-A) of a universal mobile telecommunication system (UMTS).

BACKGROUND OF THE INVENTION

An uplink multi-user multiple-input multiple-output (MU-MIMO) system is a virtual MIMO system where each terminal constituting the multi-user MIMO system transmits a data stream, but the data streams transmitted from the terminals occupy the same time and frequency resource, and thus from the perspective of a receiver, these data streams from the different terminals can be regarded as data streams from different antennas on the same terminal, thereby constituting an MIMO system with an improved capacity.

LTE-A evolving from LTE is directed toward higher data transmission efficiency and spectrum utilization efficiency. In order to further improve the rate of an edge user and the overall performance of a system, the coordinated multipoint transmission (CoMP) has been incorporated by the third generation partner project (3GPP) into the architecture of LTE-A. CoMP designed generally for an edge user refers to coordinated transmission and reception of data for one or more users through geographically separate transmission points, thereby improving the transmission efficiency and performance at the edge of a cell.

The architecture of CoMP differs from a network architecture of existing LTE R8 in that there are a plurality of geographically separate transmission points serving an edge user in the CoMP architecture, and a central or edge user is served only by a cell where the central or edge user is located in a traditional cellular network architecture of LTE R8. Therefore in the latter case, only a base station serving the user receives uplink data of the user in the uplink path, while in the CoMP architecture, the plurality of transmission points receive the uplink data from the user during uplink transmission.

Among coordinated transmission cells, the cells serving concurrently a user equipment (UE) form a cooperating set including a primary cell responsible for tasks of resource scheduling and allocation, coordinated data processing, etc., and one or more cooperative cells responsible for only the process of transmitting and receiving data.

The conventional coordinated multipoint transmission/reception includes intra-eNodeB (evolved NodeB) cooperation and inter-eNodeB cooperation. In a CoMP scenario of intra-eNodeB cooperation, a plurality of cells under the control of an eNodeB serve the same user, and a transmission point of each cell only has radio frequency function. Each cell transmits uplink data directly to the eNodeB for processing over a dedicated physical link upon reception of the uplink data. In a CoMP scenario of inter-eNodeB cooperation, a plurality of cells under the control of different eNodeBs serve the same user, and one of the eNodeBs is selected as a master eNodeB responsible for control operations of resource allocation and scheduling, etc. Upon reception of uplink data, a cooperative eNodeB transmits the preliminarily processed data to the master eNodeB, and the master eNodeB completes the processing of the data. Interaction of data, control, etc., is transmitted between the eNodeBs via an X2 interface.

In LTE Release 8 supporting the uplink multi-user MIMO (MU-MIMO), a user simply transmits data to a serving cell and a paired user is selected by a base station in the serving cell. According to the optimum principle of selecting a paired user, interference between the paired users is minimized, that is, channels relating to the paired users shall be orthogonal channels. As illustrated in FIG. 1, there are a number $N_r$ of antennas for reception in a cell C1 and a number $N_t$ of antennas for transmission from users U1 and U2, and there is an uplink channel H1 between the cell C1 and the user U1 and an uplink channel H2 between the C1 and the user U2. H1 and H2 represent a matrix having the dimension of $N_r \times N_t$. In order to minimize interference between the users U1 and U2, the channels H1 and H relating to the users U1 and U2 have to be orthogonal as shown in Formula 1:

$$\|H_1 H_2^H\| \approx 0 \qquad \text{Formula 1}$$

where the superscript "H" represents conjugated transposition of a matrix, and $\|A\|$ represents the norm of the matrix A.

Under the CoMP scenario, a user equipment (UE) is served by one or more cells through the same time and frequency resource, and a CoMP-MU-MIMO transmission solution arises when a plurality of users are served by a plurality of cells through the same time and frequency resource. Due to concurrent presence of the CoMP scenario and the traditional single-cell service scenario in LTE-A, there are a plurality of MU-MIMO pairing types, and a conventional user pairing process does not support multi-user MIMO under a CoMP scenario, thus resulting in a need of proposing a solution of pairing users for the uplink multi-user MIMO system under CoMP scenario.

SUMMARY OF THE INVENTION

In view of the circumstances in the prior art, the embodiments of the invention proposes a solution of pairing users for an uplink multi-user MIMO system under the CoMP scenario.

An embodiment of the invention provides a method of pairing users for uplink multi-user multiple-input-multiple-output (MU-MIMO) under coordinated multipoint transmission (CoMP) scenario in a communication system, comprising:

selecting, by a first cell of the communication system, at least one initial user served by the cell as a first paired user;

selecting, by the first cell, a candidate paired user according to the service type of the first paired user; and determining, from the different service types of the first paired user and the candidate paired user, a pairing type to be formed, and determining whether the candidate paired user and the first paired user can be paired into the pairing type to be formed by using a predetermined determination criterion according to the pairing type.

Another embodiment of the invention provides a device of performing user pairing for an uplink multi-user multipleinput-multiple-output (MU-MIMO) under coordinated multipoint transmission (CoMP) scenario, which includes:

an initial user selection unit configured to select at least one initial user served by the device as a first paired user;

a candidate paired user selection unit configured to select a candidate paired user according to the service type of the first paired user; and a user pairing unit configured to determine, from the different service types of the first paired user and the candidate paired user, a pairing type to be formed, and determine whether the candidate paired user and the first paired user can be paired into the pairing type to be formed by using a predetermined determination criterion according to the pairing type.

As can be apparent from the foregoing descriptions, the throughout and communication efficiency of the communication system can be improved with the method and device of pairing users for the uplink MU-MIMO system under CoMP scenario according to the embodiments of the invention. The average CoMP user throughout can be enhanced significantly especially in the full CoMP-MU-MIMO pairing type as compared with the CoMP scheme.

BRIEF DESCRIPTION OF THE DRAWINGS

The foregoing and other objects, features and advantages of the invention will become more readily appreciated with reference to the following description of the embodiments of the invention taken in conjunction with the drawings in which components are not necessarily drawn to scale but merely illustrative of the principle of the invention. Identical or like technical features or components are denoted with identical or like reference numerals throughout the drawings in which:

FIG. 4A-4B are schematic diagrams illustrating configuration of CoMP+Non-CoMP MU-MIMO pairing type and partial CoMP-MU-MIMO pairing type;

FIG. 7 is a schematic principle diagram illustrating a selection criterion by which paired users are selected in the process of forming the full CoMP-MU-MIMO pairing type;

FIG. 8A-8B are schematic diagrams illustrating a result of pairing processing in the steps 302 and 303 as illustrated in FIG. 6;

DETAILED DESCRIPTION OF THE INVENTION

Figure 1:
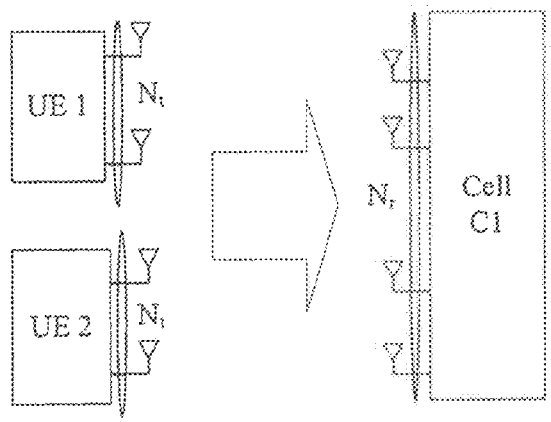
FIG. 1 is a schematic diagram illustrating an inter-user channel in an LTE communication system.

The embodiments of the invention will be described below with reference to the drawings. It shall be noted that repeated illustration and description of components and processes known to those ordinarily skilled in the art and of no relevance to the invention will be omitted in the drawings and the description for the sake of clarity.

According to an embodiment of the invention, multi-user MIMO in the CoMP scenario can be categorized into four types: traditional non-CoMP MU-MIMO, full CoMP-MU-MIMO in which all paired users are CoMP users, CoMP+Non-CoMP MU-MIMO in which a part of paired users are CoMP users and the remaining users are single-cell service users, and partial CoMP MU-MIMO in which all paired users are CoMP users having different cooperating sets of cells.

Figures 2A, 2B:
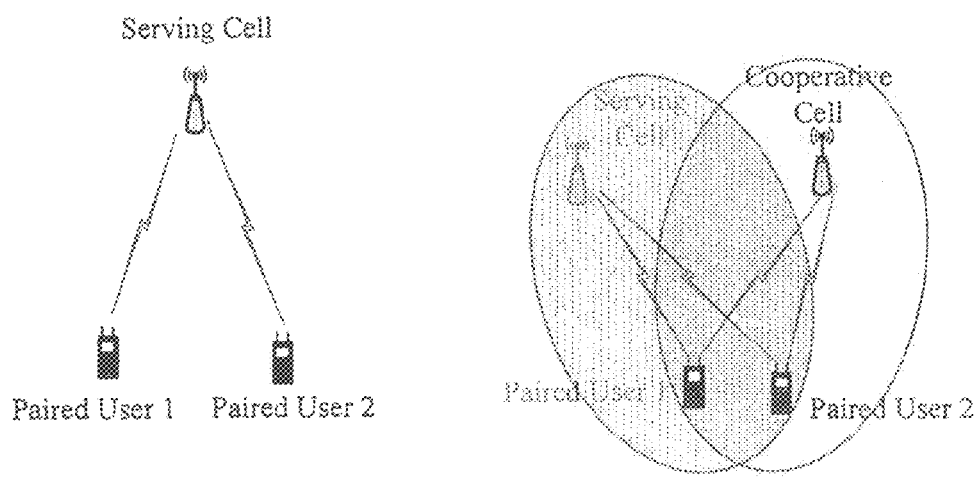
FIG. 2A-2B are schematic diagrams illustrating configuration of traditional MU-MIMO pairing type and full CoMP-MU-MIMO pairing type.

In the pairing type No. 1, i.e., the traditional MU-MIMO, as illustrated in FIG. 2A, this pairing type is equivalent to multi-user MIMO pairing in LTE where all the paired users are single-cell service users served by the same one cell.

In the pairing type No. 2, i.e., the full CoMP-MU-MIMO, as illustrated in FIG. 2B, all the paired users are CoMP users having the same cooperating set, which means that the paired users are served concurrently by a plurlaity of cells through the same time and frequency resource. This pairing type can be subcategorized into two pairing subtypes dependent upon different modes in which the CoMP users are selected.

Figures 3A, 3B:
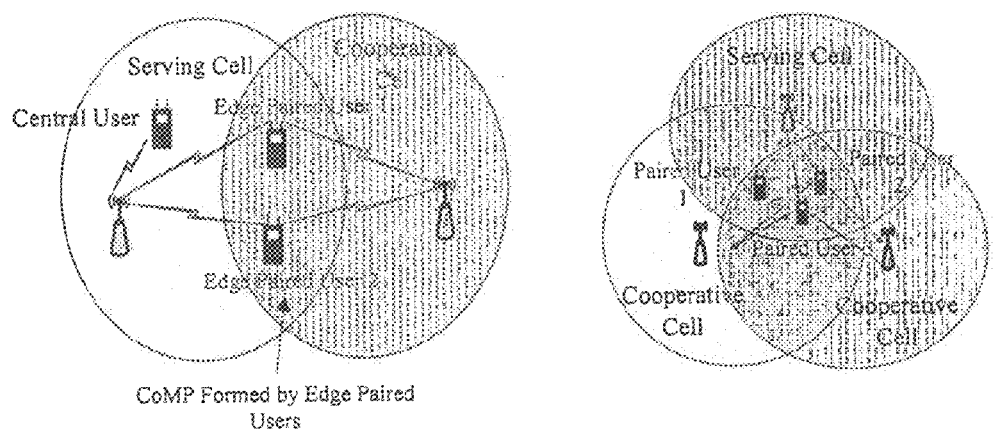
FIG. 3A-3B are schematic diagrams illustrating configuration of two subtypes of CoMP-MU-MIMO pairing type.

In the subtype A of the pairing type No. 2, as illustrated in FIG. 3A, only an edge user can result in a CoMP user and a central user is a single-cell service user in this CoMP type. Therefore in this CoMP type, all of the users which can form this pairing type No. 2 are edge users, and these edges user satisfy a condition for forming the CoMP and call the paired users have the same cooperating set of cells.

In the subtype B of the pairing type No. 2, as illustrated in FIG. 3B, an edge user and a central user is not distinguished from each other any longer and all of the users are CoMP users served concurrently by a plurality of cells in this CoMP type. Therefore in this CoMP type, it is only necessary for the users which can form this pairing type No. 2 to satisfy a condition of having the same cooperating set of cells.

Figures 4, 4A:
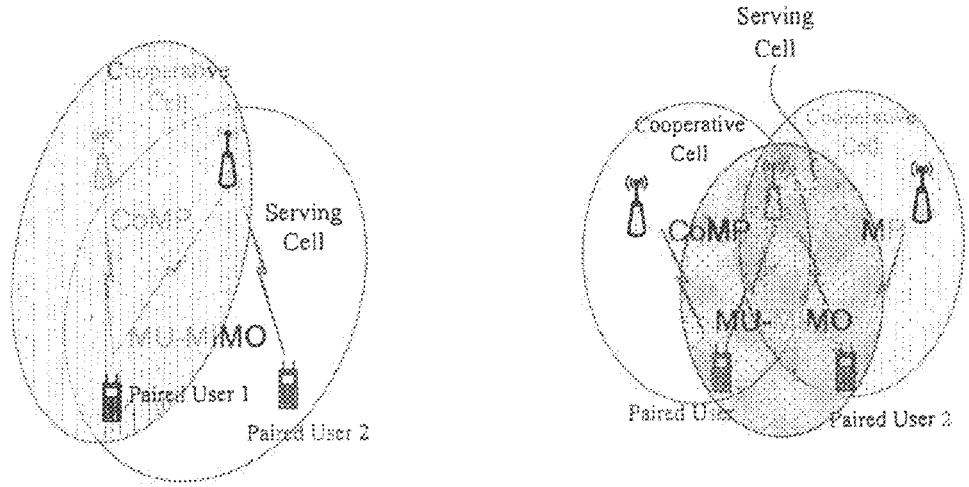

In the pairing type No. 3, i.e., the CoMP+Non-CoMP MU-MIMO pairing type, as illustrated in FIG. 4A, a part of paired users are single-cell service users and the remaining part of users are CoMP users, and the paired users transmit data through the same frequency resource.

In the pairing type No. 4, i.e., the partial CoMP-MU-MIMO pairing type, as illustrated in FIG. 4B, all of paired users are CoMP users, and the difference of this pairing type No. 4 from the pairing type No. 2 lies in that the cooperating sets of all the paired users are not identical but instead only a part of the cooperating sets have a intersection. In the resultant MU-MIMO, the CoMP users are served as they are, and the traditional Non-CoMP MU-MIMO or full CoMP-MU-MIMO paring type is formed between the paired users and their same cooperating set(s) dependent upon whether there is one or more same cooperating sets.

In view of the foregoing categorized MU-MIMO pairing types under the CoMP scenario, the embodiments of the invention proposes a solution for pairing users for an uplink multi-user MIMO system in which the coordinated multi-point transmission is supported, i.e., a solution concurrently supporting the four user pairing types of the traditional MU-MIMO, the full CoMP-MU-MIMO, the CoMP+Non-CoMP MU-MIMO and the partial CoMP-MU-MIMO. Of course, those skilled in the art can readily appreciate that the method for selecting and pairing users according to the embodiments of the invention can also be applicable to any appropriate user pairing type under the CoMP scenario, repeated descriptions of which will be omitted here.

Figure 5:
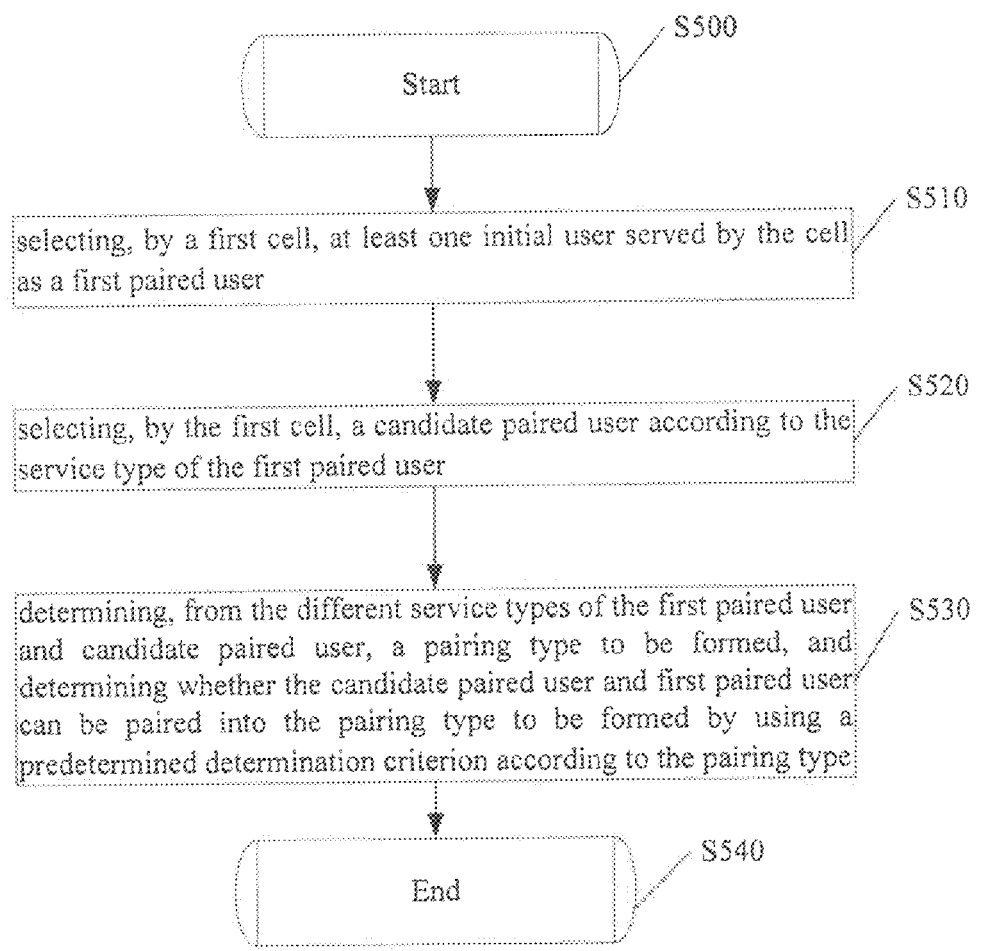
FIG. 5 is a simplified flow chart illustrating a method of pairing users for an uplink MU-MEMO system under coordinated multipoint transmission CoMP scenario according to an embodiment of the invention.

FIG. 5 is a simplified flow chart illustrating a method of pairing users for an uplink MU-MIMO system under coordinated multipoint transmission (CoMP) scenario according to an embodiment of the invention. As illustrated in FIG. 5, the method for pairing users according to the embodiment of the invention includes: the step S510 of selecting, by a first cell of the communication system, at least one initial user served by the cell as a first paired user; the step S520 of selecting, by the first cell, a candidate paired user according to the service type of the first paired user; and the step S530 of determining, from the different service types of the first paired user and the candidate paired user, a pairing type to be formed, and determining whether the candidate paired user and the first paired user can be paired into the pairing type to be formed by using a predetermined determination criterion according to the pairing type.

Figure 6:
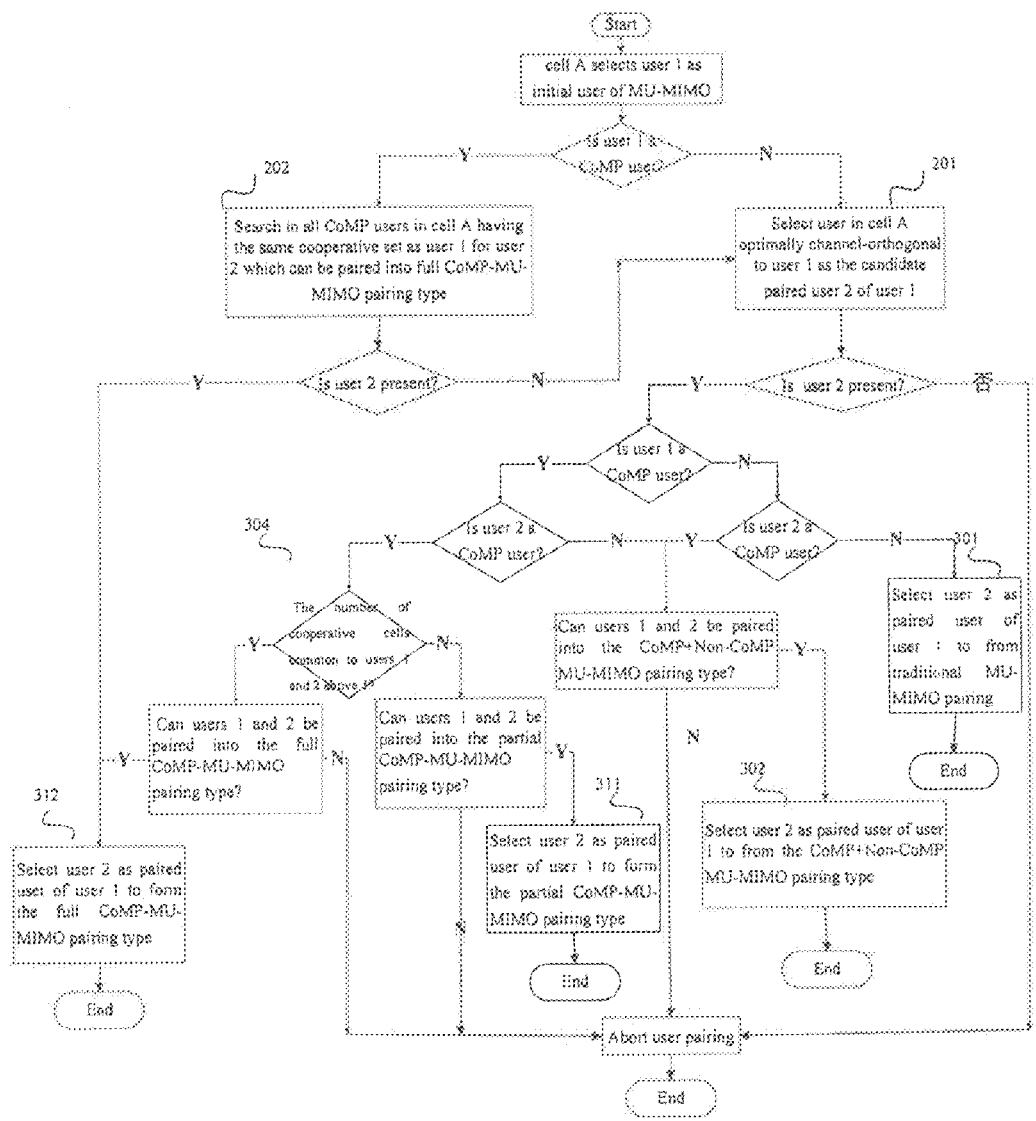
FIG. 6 is a detailed flow chart illustrating a specific example of the method for pairing users according to the embodiment illustrated in FIG. 5.

FIG. 6 is a detailed flow chart illustrating a specific example of the method for pairing users according to the embodiment illustrated in FIG. 5. As can be apparent from the figure, in this example, a paired user is selected by selecting the paired user and its corresponding MU-MIMO implementation mode for multiple situations in respective steps according to the transmission mode of the initial user.

As illustrated in FIG. 6, specific implementation steps of selecting the paired user in this example are as follows:

Step 1: A cell A initiates an MU-MIMO user selection process so that the cell A selects a service user, e.g., a user 1, in the present cell as a first paired user of MU-MIMO in response to a service demand or by a scheduling algorithm, e.g., polling, random selection, proportion fairness, etc.

Step 2: The cell A selects a candidate paired user for the user 1 in different situations according to the service type of the user 1. The following two situations arise dependent upon the service mode provided by the cell A for the user 1:

The flow goes to the step 201 when the user 1 is a single-cell user; or

The flow goes to the step 202 when the user 1 is a CoMP user.

Step 201: The cell A selects a candidate paired user 2 according to uplink channel information and scheduling information of the existing user(s) in the cell by using a criterion, e.g., random selection, a principle concerning channel orthogonality, DPS (determinant pairing scheduling), OPS (orthogonal pairing scheduling), etc. If no user 2 can be found, then the selection of the paired user fails and the pairing process ends.

Step 202: The cell A searches in all of CoMP users served by the present cell for a user having the same cooperating set as the user 1 and adds the found user into a list of candidate users. If a cooperative cell does not belong to the same eNodeB as the cell A, then the cell A signals the cooperative cell of the user 1 via an X2 interface to request the cooperative cell to report information relating to uplink channels between all the users in the list of candidate users and the user 1 and their respective cells. The cooperative cell transmits the information relating to the channels, including explicit channel information (channel matrixes) and implicit channel forms (PMI (pre-coding matrix indicators (PMI), channel correlation matrixes, etc.), via the X2 interface upon reception of the control signaling. The cell A determines, according to the information related to uplink channels reported from the cooperative cell, whether the respective users in the list of candidate users can be paired with the user 1 into the full CoMP-MU-MIMO pairing type by using a criterion No. 1. If there is one user or multiple users satisfying the condition, then the cell A selects the one user 2 or selects the optimum user 2 among the multiple users as a paired user of the user 1 by Formula 3 and notifies the cooperative cell about a result of selecting the parried user, and the pairing process ends. If no user satisfies the condition, then the flow goes to the step 201.

In the criterion No. 1, the paired user 2 of the full CoMP-MU-MIMO paring type is selected as illustrated in FIG. 7. Assuming a serving cell of the full CoMP-MU-MEMO is denoted with A, ($1 < i < N$, where N denotes the number of serving cells, and a channel of a user j to the serving cell is denoted with $H_{ji}$ (j=1, 2), channel conditions between the paired users and all the cooperative cells, including the primary cell, shall satisfy Formula 2, where R denotes a threshold related to channel determined in response to a varying usage demand.

$$\|H_{1i}H_{2i}^{H}\| < R (i \in N) \qquad \text{Formula 2}$$

The optimum user may be selected among the optional users determined above.

$$k = \operatorname{argmin}(\|H_{1i}H_{ki}^{H}\|)(i \in N, k=2, \ldots, M) \qquad \text{Formula 3}$$

where M denotes the total number of users, k=1 denotes the initial user, and k>1 denotes the candidate user(s).

In the processing of the forgoing step 202, if the information related to channel transmitted between the cell A and the cooperative cell of the user 1 via the X2 interface is other implicit channel information than the explicit channel information (channel matrixes), then the explicit channel information can be derived from the implicit channel information by various known methods so as to make the determination illustrated in the criterion No. 1.

Moreover, although the candidate user 2 is selected among all of the CoMP users served by the cell A in the step 202, the invention will not be limited thereto and the candidate user 2 can be selected among the single-cell service users served by the cell A through any other appropriate criterion provided that it is allowable by the performance of the system.

Step 3: The following situations arise dependent upon the service modes provided by the cell A for the user 1 and the user 2.

The flow goes to the step 301 when both the user 1 and the user 2 are single-cell service users;

The flow goes to the step 302 when the user 1 is a single-cell service user and the user 2 is a CoMP user;

The flow goes to the step 303 when the user 1 is a CoMP service user and the user 2 is a single-cell service user; or The flow goes to the step 304 when both the user 1 and the user 2 are CoMP users.

Step 301: The user 2 is selected as the paired user of the user 1 to generate the traditional MU-MIMO pairing type, and the pairing process ends.

Step 302: The cell A sets a set S that includes all cooperative cells (including the primary cell A) of the user 2, and notifies the user 1 via a downlink radio channel to measure pilot power (RSRP) of the user 1 with respect to all the cells in the set S. The user 1 feeds measurement results back to the cell A, and the cell A determines whether to select the user 2 as a paired user by using a criterion No. 2. If the condition is satisfied, then the user 2 is selected as the paired user of the user 1 to form the CoMP+Non-CoMP MU-MIMO pairing type (as illustrated in FIG. 8A), and the pairing process ends.

Figure 9:
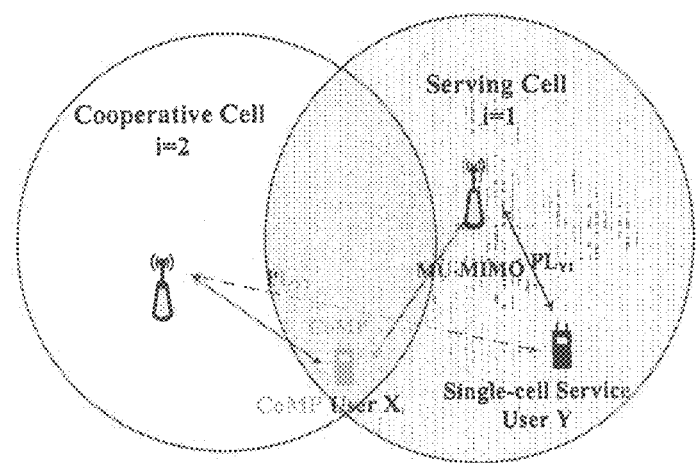
FIG. 9 is a schematic principle diagram illustrating a criterion by which paired users are selected in the process of forming the CoMP+Non-CoMP MU-MIMO pairing type.

In the criterion No. 2, the paired user 2 of the CoMP+Non-CoMP MU-MIMO pairing type is selected as illustrated in FIG. 9. Assuming a CoMP user is denoted with X, a single-cell service user is denoted with Y (the broken line means that the cooperative cell (i=2) does not provide service for the user Y), and downlink pilot transmission power of the cell in LTE is predetermined as P, a path loss of a user to a cell can be calculated from the pilot power measured by the user as Path Loss=Downlink Pilot Transmission Power—User Measured Pilot Power by the following formula:

$$PL=P_{RS}-RSRP_{measured} \quad \text{Formula 4}$$

If the CoMP+Non-CoMP MU-MIMO pairing type is to be formed for the users X and Y, then the following Formula 5 shall be satisfied:

$$PL_{Yi}-PL_{Y1}>SINR_{Xi}+Th \quad \text{Formula 5}$$

where i denotes the identifier of a cooperative cell of the CoMP user, $PL_{Y1}$ denotes the path loss of the single-cell service user to a primary cell of the CoMP user, $PL_{Yi}$ denotes the path loss of the single-cell service user to the cooperative cell i of the CoMP user, $SINR_{Xi}$ denotes a signal to interference plus noise ratio of a signal received in the cooperative cell i from the CoMP user, and Th denotes a preset threshold concerning an interference level of the user Y to the user X, which shall be preset in response to a practical demand. For example, the preset threshold of the interference level Th is determined in the following formula:

$$Th=10 \log_{10}(10^{X/10}-1) \quad \text{Formula 6}$$

where X denotes an SNR level at which reception is not subject to significant interference, and the SNR level can be derived in a known method.

Step 303: The cell A sets a set T which includes all cooperative cells (including the primary cell A) of the user 1, and signals the user 2 via the downlink radio channel to notify it to measure the pilot power (RSRP) of the user 2 with respect to all the cells in the set T. The user 2 feeds measurement results back to the cell A, and the cell A determines whether to select the user 2 as the paired user by using the criterion No. 2. If the condition is satisfied, then the user 2 is selected as the paired user to form the CoMP+Non-CoMP MU-MIMO pairing type together with the user 1 (as illustrated in FIG. 8B), and the pairing process ends.

Step 304: The cell A sets a set C which includes the same cooperative cells of the user 1 and the user 2, a set S1 which includes those cooperative cells in the cooperating set of the user 1 but not in the set C and a set S2 which includes those cooperative cells in the cooperating set of the user 2 but not in the set C. Two situations arise dependent upon the number of cells in the set C. If the set C includes only one cell, i.e., the primary cell of two paired users, then the flow goes to the step 311; otherwise, the flow goes to the step 312.

Step 311: The cell A notifies the user 2 to measure the pilot power (RSRP) of the user 2 with respect to all the cells in the set S1, and notifies the user 1 to measure the pilot power (RSRP) of the user 1 with respect to all the cells in the set S2. The users 1 and 2 feed back the measurement results to the cell A. The cell A determines whether pairing requirements stipulated in a criterion No. 3 are satisfied. If the criterion No. 3 is satisfied, then the user 2 is selected as the paired user to form the partial CoMP-MU-MIMO pairing type, and the pairing process ends.

Figure 10:
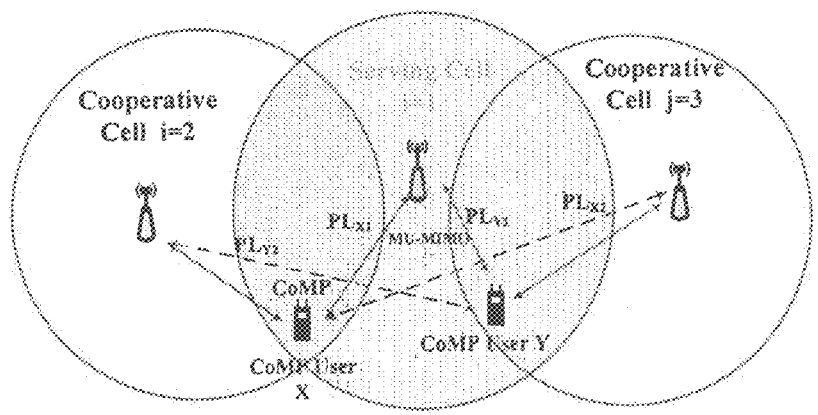
FIG. 10 is a schematic principle diagram illustrating a user selection criterion in the process of forming the partial CoMP-MU-MIMO pairing type.

The criterion No. 3 stipulates the selection of user 2 for the partial CoMP-MU-MIMO pairing in the event that the set C includes only the primary serving cell. As illustrated in FIG. 10, assuming the set of cooperative service cells (precluding the primary cell) of the user X is denoted with S1 and the set of cooperative service cells (precluding the primary cell) of the user Y is denoted with S2, and the broken lines mean that corresponding cells do not provide services for corresponding users connected by the broken lines, if the partial CoMP-MU-MIMO pairing type is to be formed for the users X and Y, then Formula 6 shall be satisfied:

$$PL_{Yi}-PL_{Y1}>SINR_{Xi}+Th_{x}, i \in S1$$

$$PL_{Xj}-PL_{X1}>SINR_{Yj}+Th_{y}, j \in S2 \quad \text{Formula 7}$$

where i and j denote the identifiers of cooperative cells of the CoMP user, PL denotes a path loss of a user to a cell, SINR denotes a signal to interference plus noise ratio of a signal received in the cooperative cell from the CoMP user, $Th_X$ denotes a preset threshold of an interference level to the user X, and $Th_Y$ denotes a preset threshold of an interference level to the user Y, and these preset thresholds shall be preset in response to practical demand.

Step 312: If the cells in the set C do not belong to the same eNodeB, then the cell A signals the cooperative cells in the set C via the X2 interface to request the cooperative cells to report information relating to uplink channels of the user 1 and the user 2. Upon reception of the control signaling, the cooperative cells transmit the information relating to the uplink channels, including the explicit channel information (channel matrixes) and the implicit channel forms (PMI (pre-coding matrix indicators (PMI), channel correlation matrixes, etc.), via the X2 interface. The cell A determines whether the user 1, the user 2 and the cells in the set C can form the full CoMP-MU-MIMO pairing type by using the criterion No. 1 according to the information relating to the uplink channels reported from the cooperative cells. If the criterion No. 1 is satisfied, then the cell A instructs the cells in the set S1 and the set S2 to interrupt serving the user 1 and the user 2, and notifies all the cells in the set C that the cooperating set of the user 1 and the user 2 is changed to the set C. The user 1 selects the user 2 as the paired user to form, together with the cells in the set C, the full CoMP-MU-MIMO pairing type, and the pairing process ends.

Step 4: The paired user is selected and a measure against pairing failure is applied according to a determination result of the step 3. Specifically, if no appropriate paired user can be found in any of the foregoing processes, then when the user 1 is a single-cell service user, the single-cell service user whose channel has the optimum channel orthogonality with respect to the channel of the user 1 is selected in the cell A as the optimum paired user 3 of the user 1. Further, if no such user 3 is present, then the cell A aborts selection of a paired user for the user 1.

Those skilled in the art can appreciate that the measure against pairing failure applied in the foregoing step 4 can be any other appropriate strategy to be applied as required in practice other than aborting the selection of a paired user for the user 1. For example, the user 1 may be taken as an initial user, and another candidate paired user can be reselected for pairing with the user 1 in the foregoing steps 2 and 3 of the method.

Although the foregoing descriptions have been presented in an example of pairing the initial user and another user, the invention will not be limited thereto. For example, after completing the pairing of the user 1 and the user 2, the combination of the user 1 and the user 2 can be regarded as an initial user, i.e., a first paired user, and a third user can be located for pairing with the initial user similarly in the foregoing method, and so on. The process of pairing can be applied for more than two users provided that this is allowable by the resource configuration and overload of the system.

According to another alternative embodiment, the system can predetermine that multiple users will be paired for the user. For example, assuming the system presets that two users will be located for pairing with the user 1, and then in the foregoing step 201, both of the optimum and less than optimum users are selected as candidate paired users by using a predetermined criterion (e.g., random selection, a principle concerning the channel orthogonality, DPS (determinant pairing scheduling), OPS (orthogonal pairing scheduling), etc.). In the step 202, both of the optimum and less than optimum candidate users, e.g., the user 2 and the user 3, are selected as the candidate paired users by using the criterion No. 1 among users served by base stations which are the same as the CoMP base stations of the user 1. Due to mutual interference between the respective two of the users 1-3, it is required to determine whether a channel condition between every two of the users 1-3 is below the threshold R as illustrated in Formula 2 above, for example, by Formula 8 or 9 as follows:

$$\|H_{1i}H_{2i}\|+\|H_{1i}H_{3i}\|+\|H_{2i}H_{3i}\|< R(i \in N) \quad \text{Formula 8}$$

or $$\|H_{1i}H_{2i}\|< R(i \in N)$$

$$\|H_{1i}H_{3i}\|< R(i \in N)$$

$$\|H_{2i}H_{3i}\|< R(i \in N) \quad \text{Formula 9}$$

Correspondingly, the optimum and less than optimum candidate users under the channel condition derived in Formula 8 or 9 are selected by using Formula 3 above. Of course, those skilled in the art can appreciate that determination modes related to the foregoing criterion No. 1 will not be limited to the forms in Formulas 8 and 9 but can be in various appropriate forms adoptable in practice. For example, the three thresholds R in Formula 9 above can be set to be different from each other.

As can be apparent from the foregoing descriptions, in the step 312, in the event that both the user 1 and the user 2 are CoMP users, the full CoMP-MU-MIMP pairing type is formed preferentially for the user 1 and the user 2, and if the full CoMP-MU-MIMP pairing type can not be formed, then the pairing process ends, and this pairing solution will fairly optimize the overall performance of the system. However, the invention will not be limited thereto, and alternatively an attempt can be made to form the partial CoMP-MU-MIMP pairing type for the user 1 and the user 2 in the event that the full CoMP-MU-MIMP pairing type can not be formed, or it may not be necessary that the full CoMP-MU-MIMP pairing type shall be formed preferentially provided that the pairing type to be formed still can offer the required performance of the system.

In the foregoing steps 202 and 312, the information relating to the channels is transmitted between the service cell A of the user 1 and the corresponding cooperative cell via the X2 interface through the control signaling. The control signaling may include, for example, a measure request, a resource allocation instruction, a resource scheduling request, etc. Since both the selection of the paired user and resource scheduling is decided by a serving cell which nevertheless is unaware of the channel information between the user and a cooperative cell (uplink channel information is measured by an eNodeB (e.g., a base station)), the cooperative cell shall transmit its local channel information to the serving cell adapted for the selection and resource scheduling. There are various types of data exchanged between eNodeBs, e.g., I/Q information, soft demodulated information, block information, bit information, etc., dependent upon different combination methods in uplink CoMP. The adopted type of exchanged data depends upon the transmission capability of the X2 interface and also has an influence on the performance of CoMP and CoMP-MU-MIMO. Which specific type of exchanged data to be used can be determined dependent upon the resource configuration of the system, etc., and detailed descriptions thereof will be omitted here for the sake of brevity.

Moreover, although the solution of pairing users for an uplink multi-user MIMO system under the coordinated multipoint transmission scenario according to the embodiment of the invention has been described above based on the four pairing types of the traditional MU-MIMO, the full CoMP-MU-MIMO, the CoMP+Non-CoMP MU-MIMO and the partial CoMP-MU-MIMO in a CoMP scenario, those skilled in the art shall appreciate that the foregoing method for pairing users according to the embodiments of the invention will not be limited thereto but can be implemented in other possible pairing types, and repeated descriptions of which will be omitted here.

Several application examples of the invention will be detailed below with reference to FIG. 11 to FIG. 13.

Application Example 1

Figure 11:
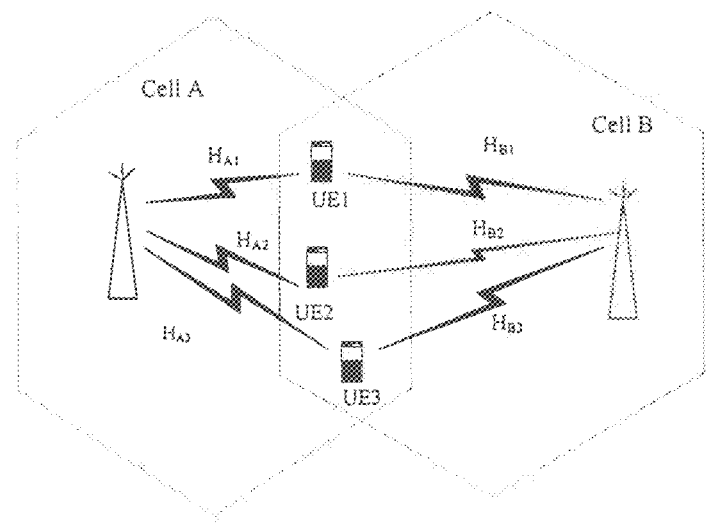
FIG. 11 is a schematic diagram illustrating an application example of generating a full CoMP-MU-MIMO pairing type.

See FIG. 11

FIG. 11 illustrates a pairing scenario in which the initial user 1 selected by the cell A is a CoMP user. The specific pairing process and criterion application are as follows:

1. The cell A initiates an MU-MIMO pairing process and selects randomly the user 1 as an initial user.
2. As illustrated, the user 1 is a CoMP user having a cooperating set including the cell A and the cell B, and the process goes to the step 202.
    The user A firstly searches in the cell A for all of users having a cooperating set including the cell A and the cell B, as a result of which two users, i.e., the user 2 and the user 3, are found.
    The cell A and the cell B belong to different eNodeBs, and the cell A signals to the cell B via the X2 interface to request the cell B to report information relating to uplink channels of the user 1, the user 2 and the user 3 to the cell B.
    The cell B feeds back explicit channel information $H_{B1}$, $H_{B2}$ and $H_{B3}$ via the X2 interface.
    The cell A determines whether the user 2 and the user 3 can be paired with the user 1 respectively into the full CoMP-MU-MIMO pairing type by using the criterion No. 1.

Given a preset threshold R=0.3, the cell A calculates the following channel correlations from its measured channel information $H_{A1}$, $H_{A2}$ and $H_{A3}$ and draws a conclusion:

$\|H_{A1}H_{A2}{}^H\|=0.25<0.3$ and $\|H_{B1}H_{B2}{}^H\|=0.18<0.3$, so the users 1 and 2 satisfy the criterion No. 1.

$\|H_{A1}H_{A3}{}^H\|=0.28<0.3$ and $\|H_{B1}H_{B3}{}^H\|=0.12<0.3$, so the users 1 and 3 satisfy the criterion No. 1.

Since there is more than one user satisfying the condition, one of the users is selected by Formula 3 of k=arg min($\|H_{1i}H_{ki}{}^H\|$). $\|H_{1i}H_{ki}{}^H\|$ takes the minimum of 0.12 when k takes 3, and therefore the user 3 is selected as the paired user of the user 1.

3. The cell A notifies the cell B that the user 3 has been selected as the paired user of the user 1 to form the full CoMP-MU-MIMO pairing type. The pairing process ends.

Application Example 2

Figure 12:
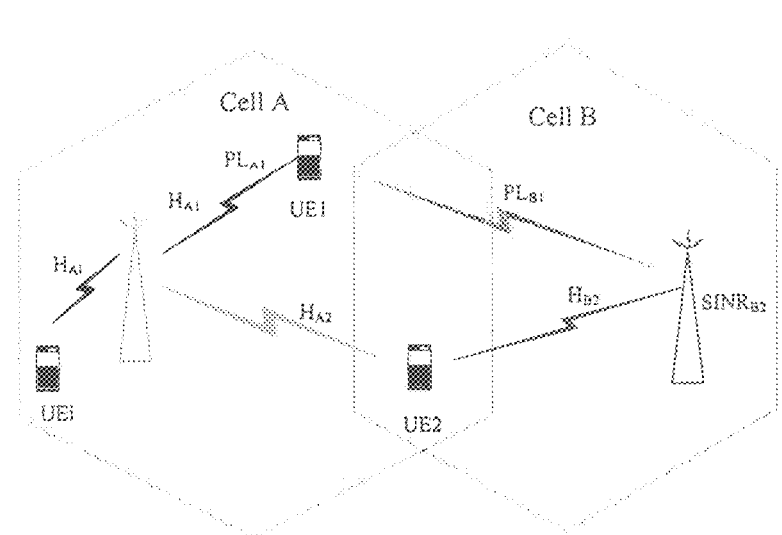
FIG. 12 is a schematic diagram illustrating an application example of forming the CoMP+Non-CoMP MU-MIMO pairing type.

See FIG. 12

FIG. 12 illustrates a pairing scenario in which the initial user 1 selected by the cell A is a single-cell service user. The specific pairing process and criterion application are as following:

1. The cell A initiates an MU-MIMO pairing process and selects the user 1 as an initial user.

2. The user 1 is a single-cell service user, and the process goes to the step 201. The cell A selects the user whose channel has the optimum orthogonality with respect to the channel of the user 1 as the candidate paired user of the user 1 according to a principle concerning the channel orthogonality. In the cell A, the user 2 satisfies the condition of $\|H_{A1}H_{A2}{}^H\|<\|H_{A1}H_{Ai}{}^H\|$, and therefore is the user in the cell A whose channel has the optimum orthogonality with respect to the channel of the user 1 and selected as the candidate paired user.

3. Since the user 2 is a CoMP user and the user 1 is a single-cell service user, the process goes to the step 302.

The cell A notifies the user 1 through a downlink control channel to measure its RSRP to the cell A and the cell B, and the user feeds measurement results back to the cell A through an uplink control channel. The cell A calculates path losses $PL_{A1}$=90 dB and $PL_{B1}$=105 dB of the user 1 to the cell A and the cell B by Formula 4 of $PL=P_{RS}-RSRP_{measured}$.

The cell A transmits control signaling via the X2 interface to notify the cooperative cell B to report the SINR of data received in the cell B from the user 2, and the cell B feeds the SINR, i.e. $SINR_{B2}$=9.5 dB, back to the cell A via the X2 interface.

The cell A determines whether the pairing condition, i.e., Formula 5 of $PL_{Yi}-PL_{Y1}>SINR_{Xi}+Th$, is satisfied by using the criterion No. 2. Given the influence on data receipt of the user 2 in the cell B exerted by the user 1 is below 1 dB, the value of Th can be preset as 5 dB, and then $PL_{B1}-PL_{A1}$=105−90=15 db>$SINR_{B2}$+Th=9.5+5=14.5 dB, thus satisfying the condition, so the user 2 is selected as the paired user of the user 1.

4. The user 1 and the user 2 are paired into the CoMP+Non-CoMP MU-MIMO pairing type, and the pairing process ends.

Application Example 3

Figure 13:
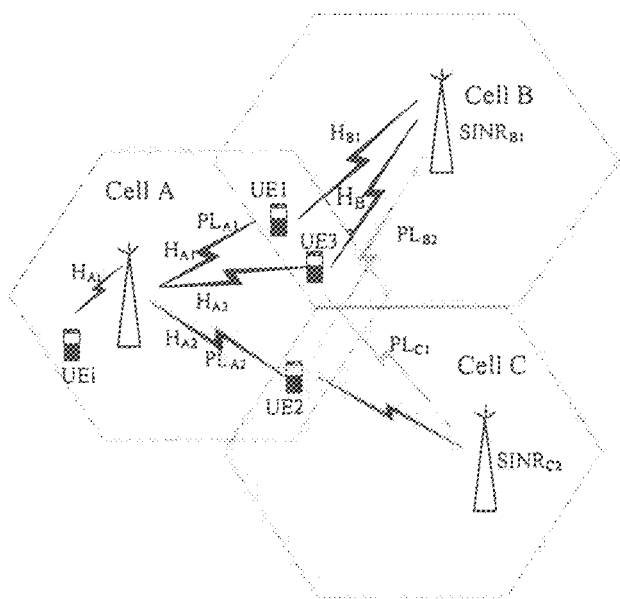
FIG. 13 is a schematic diagram illustrating an application example of a scenario where no appropriate paired user is found.

See FIG. 13

FIG. 13 illustrates a pairing scenario in which the initial user 1 selected by the cell A is a CoMP user. The specific pairing process and criterion application are as follows:

1. The cell A initiates an MU-MIMO pairing process and selects the user 1 as an initial user.

2. The user 1 is a CoMP user having a cooperating set including the cell A and the cell B, and the process goes to the step 202.

The user A firstly searches in the cell A for all users having a cooperating set including the cell A and the cell B, as a result of which a user, i.e., the user 3, is found.

The cell A and the cell B belong to different eNodeBs, and the cell A signals to the cell B via the X2 interface to request the cell B to report information relating to uplink channels of the user 1 and the user 3 to the cell B.

The cell B feeds back explicit channel information $H_{B1}$ and $H_{B3}$ via the X2 interface.

The cell A determines whether the user 2 and the user 3 can be paired with the user 1 respectively into the full CoMP-MU-MIMO pairing type by using the criterion No. 1.

Given a preset threshold R=0.3, the cell A calculates the following channel correlations from its measured channel information $H_{A1}$, $H_{A2}$ and $H_{A3}$ and draws a conclusion:

$\|H_{A1}H_{A3}{}^H\|=0.28<0.3$ and $\|H_{B1}H_{B3}{}^H\|=0.45>0.3$, so the users 1 and 3 do not satisfy the criterion No. 1 and can not form the full CoMP-MU-MIMO pairing type.

No user for the full CoMP-MU-MIMO pairing is present, and the process goes to the step 201.

3. The cell A selects the user whose channel has the optimum orthogonality with respect to the channel of the user 1 as a candidate paired user of the user 1 by a principle concerning channel orthogonality. In the cell A, the user 2 satisfies the condition of $\|H_{A1}H_{A2}{}^H\|<\|H_{A1}H_{Ai}{}^H\|$, and therefore is the user in the cell A whose channel has the optimum orthogonality with respect to the channel of the user 1 and selected as the candidate paired user.

4. Since the user 2 is also a CoMP user having the cooperative cells including the cell A and the cell C. The user 1 and the user 2 have only one common cooperative cell, i.e., the primary cell A, so the process goes to the step 311.

The cell A notifies the user 1 through a downlink control channel to request the user 1 to measure its RSRP to the cell A and the cell C. The user feeds measurement results back to the cell A, and the cell A calculates path losses $PL_{A1}$=93 dB and $PL_{B1}$=100 dB of the user 1 to the cell A and the cell B by Formula 4 of $PL=P_{RS}-RSRP_{measured}$.

The cell A notifies the user 2 through the downlink control channel to request the user 2 to measure its RSRP to the cell A and the cell C. The user feeds measurement results back to the cell A, and the cell A calculates path losses $PL_{A2}$=92 dB and $PL_{C2}$=103 dB of the user 2 to the cell A and the cell C by Formula 4 of $PL=P_{RS}-RSRP_{measured}$.

The cell A notifies the cooperative cell B to report the $SINR_{B1}$=6.1 dB of data received in the cell B from the user 1.

The cell A notifies the cooperative cell C to report the $SINR_{C2}$=5.9 dB of data received in the cell C from the user 2.

It is determined by the criterion No. 3 whether the pairing condition indicated in the following Formula 6 is satisfied:

$$PL_{Yi}-PL_{Y1}>SINR_{Xi}+Th_X i \in S1$$

$$PL_{Xj}-PL_{X1}>SINR_{Yj}+Th_Y j \in S2 \quad \text{(Formula 6)}$$

Given the influence on data receipt of the user 2 in the cell C exerted by the user 1 is below 1 dB, the value of $Th_X$ can be preset as 5 dB. Given the influence on data receipt of the user 1 in the cell B exerted by the user 2 is below 1 dB, the value of $Th_Y$ can be preset as 5 dB. Then, $PL_{B1}-PL_{A1}$=100−93=7 dB($SINR_{B1}$+Th=6.1+5=11.1 dB, so the user 1 does not satisfy the condition; and $PL_{C2}-PL_{A2}$=103−92=11d>$SINR_{C2}$+Th=5.9+5=10.9 dB, so the user 2 satisfy the condition. Thus, the criterion No. 3 is not satisfied, and the user 1 and the user 2 do not satisfy the pairing condition.

5. No CoMP user is fond in the foregoing process, and the cell A aborts selection of a paired user for the user 1 as the user 1 is a CoMP user.

Figure 14:
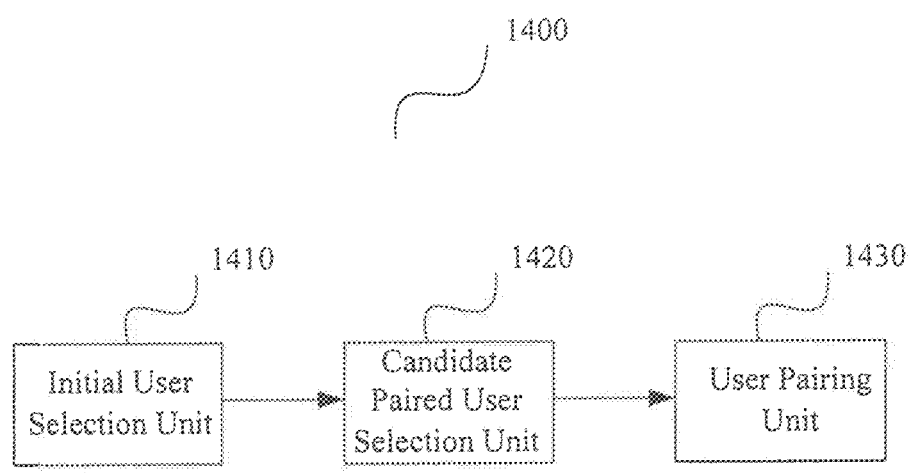
FIG. 14 is a simplified block diagram illustrating a device for performing user pairing for an uplink MU-MIMO system under CoMP scenario according to an embodiment of the invention.

Moreover, there is further provided a device for performing a method of pairing users for an uplink MU-MIMO system under coordinated multipoint transmission (CoMP) scenario according to another embodiment of the invention. FIG. 14 illustrates a simplified block diagram of this device. As illustrated in FIG. 14, the device 1400 includes: an initial user selection unit 1410 configured to select at least one initial user served by the device as a first paired user; a candidate paired user selection unit 1420 configured to select a candidate paired user according to the service type of the first paired user; and a user pairing unit 1430 configured to determine, from the different service types of the first paired user and the candidate paired user, a pairing type to be formed, and determine whether the candidate paired user and the first paired user can be paired into the pairing type to be formed by using a predetermined determination criterion according to the pairing type. It shall be noted that other regular components for this device have not been illustrated in the figure so as not to obscure the essence of the invention.

Those skilled in the art can appreciate the device 1400 according to the embodiment of the invention as illustrated in FIG. 14 above can be implemented as a base station in a communication system or any other appropriate communication apparatus capable of functioning as this device. For example, if user selection and pairing are not performed by a base station but by another apparatus than the base station or by the base station in cooperation with another apparatus during uplink MU-MIMO transmission under CoMP scenario in some communication systems, then this another apparatus shall apparently also be deemed as falling within the scope of the foregoing device 1400 according to the embodiment of the invention.

It shall be noted that the respective component units in the foregoing device can be configured in software, hardware or a combination of them.

Moreover a communication system including the foregoing device shall also be deemed as falling within the scope of the invention.

In summary, the embodiments of the invention disclose a solution for pairing users for the uplink multi-user MIMO system under coordinated multipoint transmission scenario. The solution involves the long term evolved system-advanced LTE-A and the introduction of the CoMP technology to LTE-A and addresses the issue of an application of the uplink multi-user MIMO in the CoMP scenario.

The solution of pairing users for the uplink multi-user MIMO system under CoMP scenario can attain advantageous technical effects. The inventors of the invention have conducted a simulation experiment for demonstration.

Figure 15:
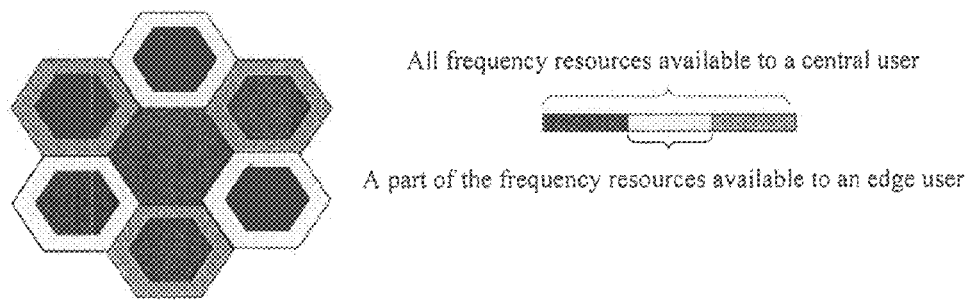
FIG. 15 a schematic diagram illustrating a experiment environment setup for conducting a simulation experiment on a scenario where the full CoMP-MU-MIMO pairing type is formed.

(I) Simulation Experiment Environment:

1) The frequency multiplexing solution as illustrated in FIG. 15 is adopted. As illustrated, all of frequency resources are available at the center of a cell, and a part of the frequency resources are available at the edge of the cell.

2) A set of MCSs (modulation and coding solution) as depicted in the table below is adopted:

TABLE 1

| Set of MCSs | | | | | | |
|---|---|---|---|---|---|---|
| Modulation | QPSK | QPSK | QPSK | 16QAM | 16QAM | 16QAM |
| Coding rate | 1/3 | 1/2 | 5/8 | 1/2 | 5/8 | 3/4 |

(3) Simulation experiment environment:

TABLE 2

| System-level simulation environment setting | |
|---|---|
| Parameter | Setting |
| Inter-site distances (m) | 500 |
| Number of cells | 7 |
| Average number of UEs per cell | 20 |
| The number of antennas (Tx, Rx) | (1, 2) |
| Distance-dependent path loss | 30.18 + 26.0 log(d), d in m |
| Lognormal Shadowing | 8 dB |
| System Noise | −174 dbm/Hz |
| Central Frequency | 2 GHz |
| System Bandwidth | 20M |
| Transmission Power | 10 lg(M) + $P_0$ + $\alpha P_L$ |
| Scheduler | Fixed resource allocation (4RB (resource block) per user) |

In the formula of $10*lg(M)+P_0+\alpha P_L$,

M: The number of RBs allocated to a UE

P0: −95 db

α: Path loss compensation factor of 0.8

Figure 16:
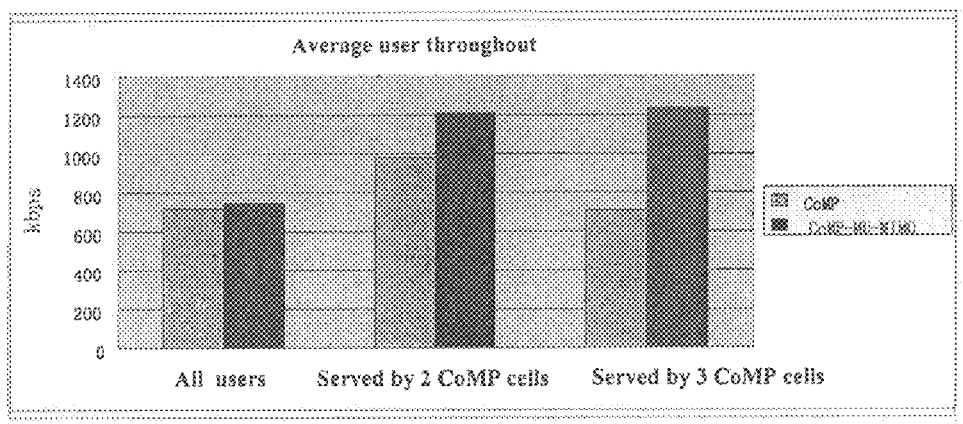
FIG. 16 is a graph illustrating a result of the simulation experiment conducted under the simulation condition as illustrated in FIG. 15.

PL: Path loss (4) Simulation experiment result:

Table 3 below and FIG. 16 present a results of the simulation experiment for the foregoing full CoMP-MU-MIMO pairing type.

TABLE 3

| | Simulation Result | | | |
|---|---|---|---|---|
| | Average cell throughput (Kbps) | Average user throughput of all users (Kbps) | Average user throughput of users served by two cells (Kbps) | Average user throughput of users served by three cells (Kbps) |
| CoMP scheme (1X2) | 12303.29 | 719.98 | 980.13 | 709.59 |
| CoMP-MU-MIMO scheme (1x2 SIMO, Single-Input Multiple-Output) | 12729.36 | 744.32 | 1214.30 | 1238.29 |
| Comparison % (CoMP-MU-MIMO/CoMP) | 103.46% | 103.38% | 123.89% | 174.50% |

As can be apparent from Table 3 and FIG. 16, the average CoMP user throughput can be enhanced significantly in the full CoMP-MU-MIMO pairing type formed by the method for selecting and pairing a user according to the embodiments of the invention. As compared with the CoMP scheme, the average user throughout can be improved by 23.89 (74.50%) when an edge user is served by two (or three) cells.

Although the foregoing specific descriptions have been presented in connection with the LTE system, those skilled in the art can appreciate that the method and device for selecting and pairing a user for the uplink MU-MIMO system under CoMP scenario according to the embodiments of the invention can also be applicable to other similar communication system including but not limited to a WiMAX/WiFi communication system.

Moreover, the method according to the foregoing respective embodiments of the invention can be implemented with a program product storing therein machine readable instruction codes which, when being read and executed by a machine, e.g., a computer, can perform the respective operation processes and steps of the method for selecting and pairing a user for the uplink MU-MIMO system under CoMP scenario according to the foregoing embodiments of the invention. The program product can be embodied in any form, e.g., object program, interpreter executable program, script program for an operating system, etc.

Correspondingly, a storage medium carrying the program product in which the machine readable instruction codes are stored shall be deemed to also fall within the scope of the invention. Such storage medium includes but will not be limited to a floppy disk, an optical disk, a magneto-optical disk, a memory card, a memory stick, etc.

In the foregoing descriptions of the embodiments of the invention, a feature described and/or illustrated in connection with an embodiment can be implemented identically or similarly in one or more other embodiments or be combined with or substituted for a feature in another embodiment.

Moreover the method according to the embodiments of the invention will not necessarily be implemented in the sequences described in the specification but can be implemented in any other sequences, concurrently or separately. Therefore, the scope of the invention shall not be limited by the sequences described in the specification in which the method is implemented.

Finally, it shall be noted that relationship terms in this specification such as the left and right, the first, the second, etc., are merely intended to distinguish one entity or operation from another but may not necessarily require or suggest presence of any such a real relationship or order between these entities or operations. Moreover, terms "comprise", "include", "contain" or any other variants thereof are intended to encompass non-exclusive inclusion, so that a process, method, article or device that comprise a list of elements include not only these elements but also other elements which have not been explicitly listed or inherent to such a process, method, article or device. Unless further defined, an expression "comprising a/an . . . " which defines an element does not preclude presence of an additional identical element(s) in the process, method, article or device that comprises the element.

Although the embodiments of the invention and their advantages have been described in detail, it shall be appreciated that various modifications, substitutions and variations can be made without departing from the scope of the invention as defined in the appended claims. Moreover, the scope of the invention will not be limited to the embodiments of the structures, means, methods and steps of the process, device, manufacturing and substance described in the specification. Those ordinarily skilled in the art can readily appreciate from the disclosure of the invention that structures, means, methods or steps of a process, device, manufacturing and substance known now or to be developed later, which perform substantially the same functions or bring out substantially the same results as the corresponding embodiments described here, can be utilized according to the invention. Therefore, the appended claims are intended to encompass in their bounds such structures, means, methods or steps of a process, device, manufacturing and substance.

What is claimed is:

1. A method of pairing users for uplink multi-user multiple input-multiple-output (MU-MIMO) in a communication system, comprising:
  A) selecting, by a first cell of the communication system, at least one initial user served by the cell as a first paired user;
  B) selecting, by the first cell, a candidate paired user according to the service type of the first paired user under coordinated multipoint transmission (CoMP) scenario; and
  C) determining, from the different service types of the first paired user and the candidate paired user, a pairing type to be formed, and determining whether the candidate paired user and the first paired user can be paired into the pairing type to be formed by using a predetermined determination criterion according to the pairing type.

2. The method according to claim 1, wherein during the process of selecting the candidate paired user in the step B, if the first paired user is a CoMP user, then another CoMP user is selected as its candidate paired user, and if the first paired user is a single-cell service user, then all other users involved in the first cell are selected as its candidate paired users.

3. The method according to claim 1, further comprising:
selecting a paired user or applying a measure against pairing failure in response to a determination result of the step C, and wherein, if it is determined in the step C that no appropriate paired user can be found for the first paired user, then a single-cell-service user in the serving cell is selected by a predetermined criterion as a paired user of the first paired user when the first paired user is a single-cell service user, and the process of finding the paired user for the first paired user is aborted if no paired user is still not present.

4. The method according to claim 1, wherein the first paired user and the candidate paired user can be paired into any pairing type selected from:
a traditional MU-MIMO pairing type in which all paired users are single-cell service users;
a full CoMP-MU-MIMO pairing type in which all paired users are CoMP users having a same cooperating set of cells, comprising two subtypes of:
  a full CoMP-MU-MIMO pairing subtype A in which all paired users are cell edge users satisfying a CoMP forming condition and having the same cooperating set of cells; and
  a full CoMP-MU-MIMO pairing subtype B in which all users of the first cell are CoMP users served concurrently by a plurality of cells and paired users have the same cooperating set of cells;
a CoMP+Non-CoMP MU-MIMO pairing type in which a part of paired users are CoMP users and the other part of the paired users are single-cell service users; and
a partial CoMP-MU-MIMO pairing type in which all paired users are CoMP users and only a part of cooperating sets of cells of the paired users is the same.

5. The method according to claim 1, wherein when a candidate paired user is selected for a CoMP user in the step B, the scenario of forming a full CoMP-MU-MIMO pairing type is considered preferentially, and a single-cell service user or a user having a different cooperating set of cells is considered as the candidate paired user upon pairing failure.

6. The method according to claim 5, wherein the process of selecting a candidate paired user for the first paired user to form the full CoMP-MU-MIMO pairing type comprises:
searching, by the first cell, in all CoMP users served by the first cell for a user having the same cooperating set of cells as the first paired user, and adding the selected user into a list of candidate paired users;
when a cooperative cell and the first cell do not belong to the same eNodeB, transmitting, by the first cell, control signaling to the cooperative cell of the first paired user via an X2 interface to instruct the cooperative cell to report information relating to uplink channels between all of users in the list of candidate paired users and the first paired user and the cooperative cell;
feeding, by the cooperative cell, the information relating to the uplink channels via the X2 interface back to the first cell upon reception of the control signaling; and
determining, by the first cell, whether the respective users in the list of candidate paired users can be paired with the first paired user into the full CoMP-MU-MIMO pairing type according to the information reported from the cooperative cell by using a first predetermined criterion.

7. The method according to claim 6, wherein the information relating to the uplink channels fed back via the X2 interface comprises at least one of a channel matrix, a pre-coding matrix indicator (PMI) and a channel correlation matrix, and every user in the list of candidate paired users whose channel conditions with respect to all cooperative cells satisfying the following formula is determined as a user who can be paired with the first paired user into the full CoMP-MU-MIMO pairing type:

$$\|H_{1i}H_{2i}^H\| < R (i \in N),$$

wherein a serving cell of the full CoMP-MU-MIMO pairing type is denoted with $A_i$, $1 < i < N$, N denotes the number of serving cells, a channel of a user j to the serving cell i is denoted with $H_{ji}$ (j=1, 2), and R denotes a threshold related to channel.

8. The method according to claim 7, wherein if there are more than one users who can be paired with the first paired user into the full CoMP-MU-MIMO pairing type, the optimum user is selected by the following formula:

$$k = \mathrm{argmin}(\|H_{1i}H_{ki}^H\|) (i \in N, k=2, \ldots, M),$$

wherein M denotes the total number of candidate paired users who can be paired with the first paired user into the full CoMP-MU-MIMO pairing type, and k denotes the serial number of the respective candidate paired users.

9. The method according to claim 4, wherein the step C) comprises determining, from the different service types of the first paired user and the candidate paired user, the pairing type to be formed by:
determining the pairing type to be formed as the traditional MU-MIMO pairing type if both the first paired user and the candidate paired user are single-cell service users;
determining the pairing type to be formed as the CoMP+Non-CoMP MU-MIMO pairing type if the first paired user is a single-cell service user and the candidate paired user is a CoMP user;
determining the pairing type to be formed as the partial CoMP-MU-MIMO pairing type if both the first paired user and the candidate paired user are CoMP users and have only one same serving cell;
determining the pairing type to be formed as the full CoMP-MU-MIMO pairing type if both the first paired user and the candidate paired user are CoMP users and have more than one same serving cells.

10. The method according to claim 9, wherein the step C) comprises, when the CoMP+Non-CoMP MU-MIMO pairing type is determined to be formed, performing the pairing process by:
setting, by the first cell, a set S which comprises all cooperative cells of the candidate paired user and is inclusive of the first cell, and notifying the first paired user through a downlink radio channel to measure its pilot power (RSRP) with respect to all the cells in the set S;
feeding, by the first paired user, measurement results back to the first cell; and
determining, by the first cell, whether to select the candidate paired user as the paired user by using a second predetermined criterion.

11. The method according to claim 10, wherein the process of determining whether to select the candidate paired user as the paired user by using the second predetermined criterion comprises:
determining that the users X and Y form the CoMP+Non-CoMP MU-MIMO pairing type if the following formula is satisfied, wherein a CoMP user and a single-cell service user among the first paired user and the candidate paired user are denoted with X and Y, respectively:

$$PL_{Yi} - PL_{Y1} > \mathrm{SINR}_{Xi} + Th,$$

wherein i denotes the identifier of a cooperative cell of the CoMP user, $PL_{Y1}$ denotes a path loss of the single-cell service user to a primary cell of the CoMP user, $PL_{Yi}$ denotes the path loss of the single-cell service user to the cooperative cell i of the CoMP user, $\text{SINR}_{Xi}$ denotes the signal to interference plus noise ratio of a signal received in the cooperative cell i from the CoMP user, and Th denotes a preset threshold of an interference level of the user Y with respect to the user X, which threshold being preset in the following formula:

$$Th = 10 \log_{10}(10^{X/10} - 1)$$

wherein X denotes a signal to noise ratio (SNR) level at which reception is not subject to significant interference.

12. The method according to claim 11, wherein the path loss is calculated in the following formula:

$$PL = P_{RS} - RSRP_{measured},$$

wherein P denotes downlink pilot transmission power of a cell in the communication system, and $RSRP_{measured}$ denotes user measured pilot power.

13. The method according to claim 9, wherein the step C) comprises, when the full CoMP-MU-MIMO pairing type is determined to be formed, performing the pairing process by:
setting a common cooperating set of cells which comprises cooperative cells common to the first paired user and the candidate paired user, and if the cells in the common cooperating set of cells do not belong to the same eNodeB, then signaling, by the first cell, the cooperative cells in the common cooperating set of cells via an X2 interface to instruct the cooperative cells to report information relating to uplink channels of the first paired user and the candidate paired user;
transmitting, by the cooperative cells, the information relating to the uplink channels via the X2 interface upon reception of the control signaling; and
determining, by the first cell, whether the first paired user, the candidate paired user and the cells in the common cooperating set of cells can form the full CoMP-MU-MIMO pairing type according to the information relating to the uplink channels reported from the cooperative cells by using a predetermined principle concerning optimum channel orthogonality.

14. The method according to claim 13, wherein the process of determining whether the first paired user, the candidate paired user and the cells in the common cooperating set of cells can form the full CoMP-MU-MIMO pairing type by using the principle concerning optimum channel orthogonality comprises:
determining that the first paired user, the candidate paired user and the respective cells in the common cooperating set of cells can form the full CoMP-MU-MIMO pairing type if channel conditions between the first paired user, the candidate paired user and all the cooperative cells satisfy the following formula:

$$\|H_{1i} H_{2i}^H\| < R (i \in N),$$

wherein the serving cell of the full CoMP-MU-MIMO pairing type is denoted with $A_i$, $1 < i < N$, N denotes the number of the serving cells, a channel of a user j to the serving cell i is denoted with $H_{ji}$ (j=1, 2), and R denotes a threshold related to channel.

15. The method according to claim 14, further comprising:
if it is determined the full CoMP-MU-MIMO pairing type can be formed, then instructing, by the first cell, cells in a first set of cells S1 and a second set of cells S2 to interrupt serving the first paired user and the candidate paired user, wherein the first set of cells S1 comprises those cells in a cooperating set of cells of the first paired user but not in the common cooperating set of cells, and the second set of cells S2 comprises those cells in a cooperating set of cells of the candidate paired user but not in the common cooperating set of cells; and
notifying, by the first cell, all the cells in the common cooperating set of cells to change the cooperating sets of cells of the first paired user and the candidate paired user to the common cooperating set of cells.

16. The method according to claim 15, wherein the step C) comprises, when the partial CoMP-MU-MIMO pairing type is determined to be formed, performing the pairing process by:
determining that the first paired user and the candidate paired user can be paired into the partial CoMP-MU-MIMO pairing type if the first paired user and the candidate paired user satisfy the following condition:

$$PL_{Yi} - PL_{Y1} > \text{SINR}_{Xi} + Th_X i \in S1$$

$$PL_{Xj} - PL_{X1} > \text{SINR}_{Yj} + Th_Y i \in S2,$$

wherein the first paired user is regarded as a CoMP user X, the candidate paired user is regarded as a CoMP user Y, a primary cell of the CoMP users X and Y is the first cell, S1 denotes a cooperating set of serving cells of the user X precluding the primary cell, S2 denotes a cooperating set of serving cells of the user Y precluding the primary cell, i and j denote the identifier of a cooperative cell of the CoMP user, PL denotes a path loss of a user to a cell, SINR denotes the signal to interference plus noise ratio of a signal received in the cooperative cell from the CoMP user, $Th_X$ denotes a preset threshold of an interference level with respect to the user X, and $Th_Y$ denotes a preset threshold of an interference level with respect to the user Y.

17. A device of performing user pairing for an uplink multi-user multiple-input-multiple-output (MU-MIMO), comprising:
a processor;
an initial user selection unit, implemented by the processor, configured to select at least one initial user served by the device as a first paired user;
a candidate paired user selection unit configured to select a candidate paired user according to a service type of the first paired user under coordinated multipoint transmission (CoMP) scenario; and
a user pairing unit configured to determine, from the different service types of the first paired user and the candidate paired user, a pairing type to be formed, and determine whether the candidate paired user and the first paired user can be paired into the pairing type to be formed by using a predetermined determination criterion according to the pairing type.

18. A device of performing user pairing for an uplink multi-user multiple-input-multiple-output (MU-MIMO) under coordinated multipoint transmission (CoMP) scenario, configured to perform the pairing method according to claim 1.

19. A non-transitory computer readable storage medium having machine readable instruction codes stored therein, wherein the instruction codes, when read and executed by a machine, are capable of causing the machine to execute the method according to claim 1.

* * * * *